No. 681,904. Patented Sept. 3, 1901.
A. H. ARMSTRONG.
NUT LOCK FOR RAIL SPLICES.
(Application filed May 21, 1901.)
(No Model.)

WITNESSES:
Chas H. Luther Jr
B. M. Simms.

INVENTOR:
Arthur H Armstrong
By Joseph A Miller & Co
ATTORNEYS.

UNITED STATES PATENT OFFICE.

ARTHUR H. ARMSTRONG, OF SANDWICH, MASSACHUSETTS, ASSIGNOR OF ONE-HALF TO SAMUEL M. EINSTEIN, OF ATTLEBORO, MASSACHUSETTS.

NUT-LOCK FOR RAIL-SPLICES.

SPECIFICATION forming part of Letters Patent No. 681,904, dated September 3, 1901.

Application filed May 21, 1901. Serial No. 61,296. (No model.)

*To all whom it may concern:*

Be it known that I, ARTHUR H. ARMSTRONG, a citizen of the United States, residing at Sandwich, in the county of Barnstable and State of Massachusetts, have invented a new and useful Improvement in Nut-Locks for Rail-Splices, of which the following is a specification.

This invention has reference to an improvement in nut-locks for rail-splices and similar devices whereby the nuts are held against turning on the bolts; and it consists in the peculiar construction and arrangements whereby the nut-lock is held by the head of one bolt and the nuts of two adjacent bolts are held by the nut-lock.

Figure 1:
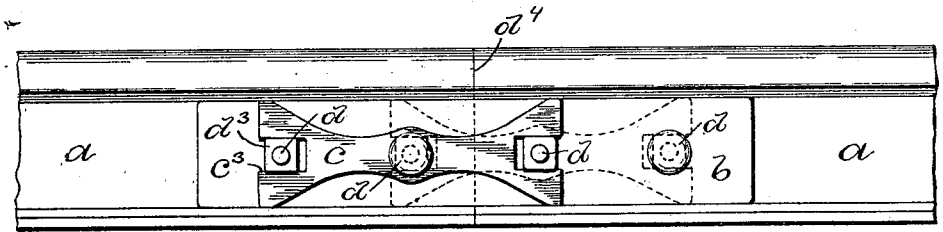
Figure 2:
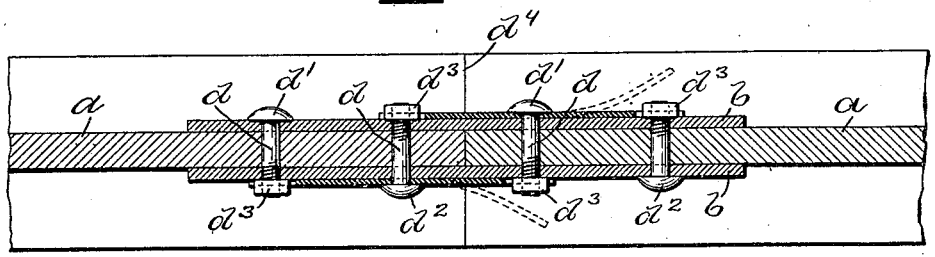
Figure 3:
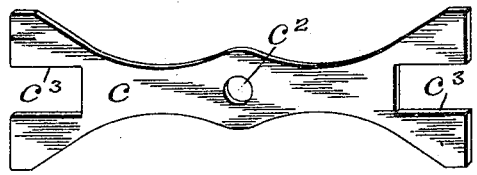
Figure 4:
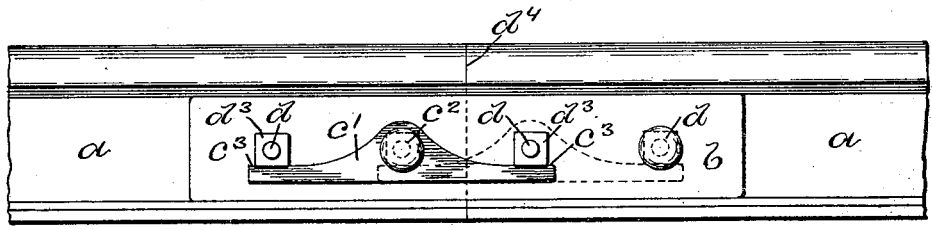

Figure 1 is a side view of a rail-splice, showing my improved nut-lock. Fig. 2 is a longitudinal sectional view of the rail-splice. Fig. 3 is a perspective view of my improved nut-lock plate. Fig. 4 is a side view of the rail-splice, showing a modified form of the nut-lock plate.

In the drawings, $a\ a$ indicate the abutting ends of the rail; $b\ b$, the fish-plates; $c$ and $c'$, the nut-lock plates, and $d\ d$ the bolts. The lock-plates have the central hole $c^2$ and the edges $c^3\ c^3$, which bear on one of the sides of the nuts.

In carrying out the invention I insert the bolts $d'\ d'$ from one side through the fish-plate and the rails of the joint and the bolts $d^2\ d^2$ from the other side, securing the lock-plates on the two sides by placing the same under the heads of the bolts nearest the joint $d^4$ and placing the edges $c^3\ c^3$ of the lock-plates against the nuts $d^3$ of the adjacent bolts. One end of the lock-plates is bent outward, as is indicated in Fig. 2 in broken lines, until the nut controlled by this end is screwed up, when the lock-plate is bent back, so that the edge or edges $c^3$ bear on the nut. The modified form of lock-plate is provided with one locking edge at each end and is firmly secured by the head of the bolt bearing on the lock-plate. It differs from the preferred form of the lock-plate shown in Fig. 3 only in that the latter has forked ends, in which two locking edges bear on the nuts.

A rail-splice constructed after my invention will resist all the blows and jars without loosening the nut-lock or allowing the nuts to turn on the bolts.

Having thus described my invention, I claim as new and desire to secure by Letters Patent—

1. In a rail-splice, the combination with the ends of the rails and the fish-plates, of centrally-perforated lock-plates having locking edges at their ends, and bolts inserted from the opposite sides to secure the lock-plates, the ends of the two lock-plates being in contact with the nuts $d^3$ of the adjacent bolts, as described.

2. In a rail-splice, the combination with the rails $a\ a$ abutting to form the joint $d^4$, the fish-plates $b\ b$ overlapping the joint, the bolts $d'$ and $d^2$ nearest the joint inserted from opposite sides through the nut-lock plate, and the centrally-perforated nut-lock plate secured by a bolt-head and having the ends in contact with the bolts of the adjacent nuts, as described.

In testimony whereof I have signed my name to this specification in the presence of two subscribing witnesses.

ARTHUR H. ARMSTRONG.

Witnesses:
 ADA E. HAGERTY,
 JOSEPH A. MILLER.